United States Patent
Chae et al.

(10) Patent No.: US 10,346,977 B2
(45) Date of Patent: Jul. 9, 2019

(54) METHOD AND DEVICE FOR GENERATING 2D MEDICAL IMAGE BASED ON PLATE INTERPOLATION

(71) Applicant: ELECTRONICS AND TELECOMMUNICATIONS RESEARCH INSTITUTE, Daejeon (KR)

(72) Inventors: Seung-Hoon Chae, Daejeon (KR); Jang Hwan Choi, Daejeon (KR); Ji Wook Jeong, Daejeon (KR); Sooyeul Lee, Daejeon (KR)

(73) Assignee: ELECTRONICS & TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 15/662,215

(22) Filed: Jul. 27, 2017

(65) Prior Publication Data
US 2018/0211381 A1     Jul. 26, 2018

(30) Foreign Application Priority Data
Jan. 23, 2017  (KR) .................. 10-2017-0010627

(51) Int. Cl.
| | | |
|---|---|---|
| G06K 9/00 | (2006.01) |
| G06T 7/00 | (2017.01) |
| G06T 7/11 | (2017.01) |
| G06T 5/50 | (2006.01) |
| G06T 11/00 | (2006.01) |

(52) U.S. Cl.
CPC .............. *G06T 7/0012* (2013.01); *G06T 5/50* (2013.01); *G06T 7/11* (2017.01); *G06T 11/00* (2013.01); *G06T 2207/10081* (2013.01); *G06T 2207/10088* (2013.01); *G06T 2207/20216* (2013.01); *G06T 2207/20221* (2013.01); *G06T 2207/30096* (2013.01); *G06T 2210/41* (2013.01)

(58) Field of Classification Search
None
See application file for complete search history.

(56) References Cited

U.S. PATENT DOCUMENTS

| | | | |
|---|---|---|---|
| 7,039,454 B1 * | 5/2006 | Kaga .................... | A61B 5/1455 324/96 |
| 7,760,924 B2 | 7/2010 | Ruth et al. | |
| 9,025,858 B2 | 5/2015 | Seong | |
| 2008/0155468 A1 * | 6/2008 | Rosander .............. | G06F 19/321 715/810 |

(Continued)

FOREIGN PATENT DOCUMENTS

KR    10-2012-0086084 A    8/2012

OTHER PUBLICATIONS

Guido Van Schie et al., "Generating Synthetic Mammograms From Reconstructed Tomosynthesis Volumes", IEEE Transactions on Medical Imaging, Dec. 2013, pp. 2322-2331, vol. 32, No. 12, IEEE.

*Primary Examiner* — Stephen P Coleman

(57) ABSTRACT

Provided is an operating method of a medical imaging device. The method includes receiving a 3D medical image, generating a 2D medical image from the 3D medical image based in a plate interpolation, and displaying the 2D medical image by using plate interpolation based weight information and interest region information.

16 Claims, 9 Drawing Sheets

(56) References Cited

U.S. PATENT DOCUMENTS

| | | | |
|---|---|---|---|
| 2009/0177075 A1* | 7/2009 | Derakhshan | G01R 33/5613 600/410 |
| 2013/0070996 A1* | 3/2013 | Liu | G06K 9/00 382/131 |
| 2014/0033126 A1* | 1/2014 | Kreeger | G06F 19/321 715/821 |
| 2014/0072196 A1 | 3/2014 | Hwang et al. | |
| 2014/0276872 A1* | 9/2014 | Song | A61F 2/4609 606/91 |
| 2015/0117742 A1 | 4/2015 | Ye et al. | |
| 2016/0224591 A1* | 8/2016 | Kim | G06F 17/30247 |

\* cited by examiner $$P_{average}(x,y) = \frac{1}{Z}\sum_{i=0}^{Z-1} I(x,y,z)$$

$$P_{MIP}(x,y) = MAX[I(x,y,0), \ldots I(x,y,Z-1)]$$

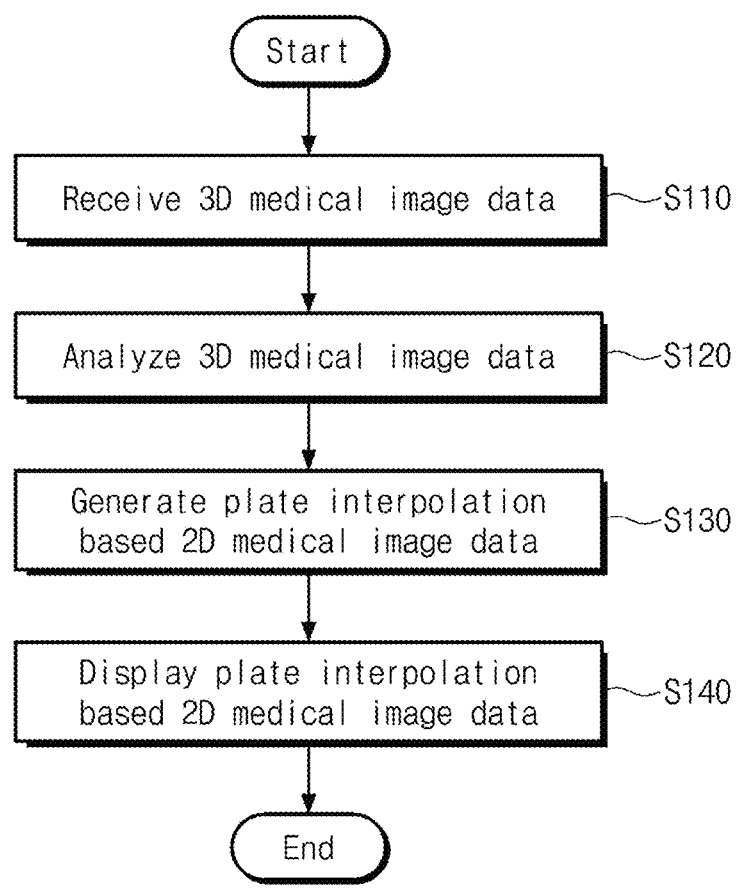

METHOD AND DEVICE FOR GENERATING 2D MEDICAL IMAGE BASED ON PLATE INTERPOLATION

CROSS-REFERENCE TO RELATED APPLICATIONS

This U.S. non-provisional patent application claims priority under 35 U.S.C. § 119 of Korean Patent Application No. 10-2017-0010627, filed on Jan. 23, 2017, the entire contents of which are hereby incorporated by reference.

BACKGROUND

The present disclosure herein relates to a plate interpolation based 2D medical image generating method and device for generating a 2D medical image that increases a reading efficiency based on a lesion or a region of interest in a 3D medical image.

A variety of medical equipments for diagnosing patients are in use or under development. Due to the convenience of the patient during the patient diagnosis process and the promptness of the patient diagnosis, the importance of medical devices such as computer tomography (CT) and magnetic resonance imaging (MRI), which show images of the internal cross-section of the human body, is becoming more increased. Recently, with the rapid development of medical equipments, there are medical equipments for outputting 3D medical images beyond a 2D medical image showing a human internal section.

SUMMARY

The present disclosure provides a device and method for generating a 2D medical image that increases the resolution of a lesion or a region of interest to improve the reading efficiency.

An embodiment of the inventive concept provides an operating method of a medical imaging device. The method includes: receiving a 3D medical image; generating a 2D medical image from the 3D medical image based in a plate interpolation; and displaying the 2D medical image by using plate interpolation based weight information and interest region information.

In an embodiment, the method may further include analyzing the received 3D medical image.

In an embodiment, the analyzing of the 3D medical image may use contrast analysis or computer assisted diagnosis.

In an embodiment, the generating of the 2D medical image may include setting an increased weight of a slice in a region of interest.

In an embodiment, the generating of the 2D medical image may include generating a single plate based 2D medical image.

In an embodiment, the generating of the 2D medical image may include generating a multi-plate based 2D medical image.

In an embodiment, the displaying of the 2D medical image may include adjusting a plate based weight for the region of interest.

In an embodiment, the displaying of the 2D medical image may include adjusting a slice based weight for the region of interest.

In an embodiment, the displaying of the 2D medical image may include adjusting the interest region information.

In an embodiment, the 2D medical image may be generated by mammography related data.

In an embodiment of the inventive concept, a medical imaging device includes: a 3D medical image analysis unit configured to receive a 3D medical image and analyze the received 3D medical image; a 2D medical image generation unit configured to generate a 2D medical image based on a plate interpolation from the analyzed 3D medical image; and a plate interpolation based viewer system configured to display the 2D medical image by using interest region information or weight adjustment information.

In an embodiment, the medical image device may include a display system including the plate interpolation based 2D medical image generation unit and the plate interpolation based viewer system.

In an embodiment, the display system may further include a user input unit for inputting the interest region information or the weight adjustment information.

In an embodiment, the plate interpolation based 2D medical image generation unit may generate a multi-plate based 2D medical image.

In an embodiment, the plate interpolation based viewer system may reduce a weight of a first region of interest when a weight plate passes a position of the first region of interest and sharpen a second region of interest by maintaining a weight of the second region of interest.

BRIEF DESCRIPTION OF THE FIGURES

The accompanying drawings are included to provide a further understanding of the inventive concept, and are incorporated in and constitute a part of this specification. The drawings illustrate exemplary embodiments of the inventive concept and, together with the description, serve to explain principles of the inventive concept. In the drawings:

FIG. 9 is a view illustrating an operating method of a medical imaging device according to an embodiment of the inventive concept.

DETAILED DESCRIPTION

Figure 1:
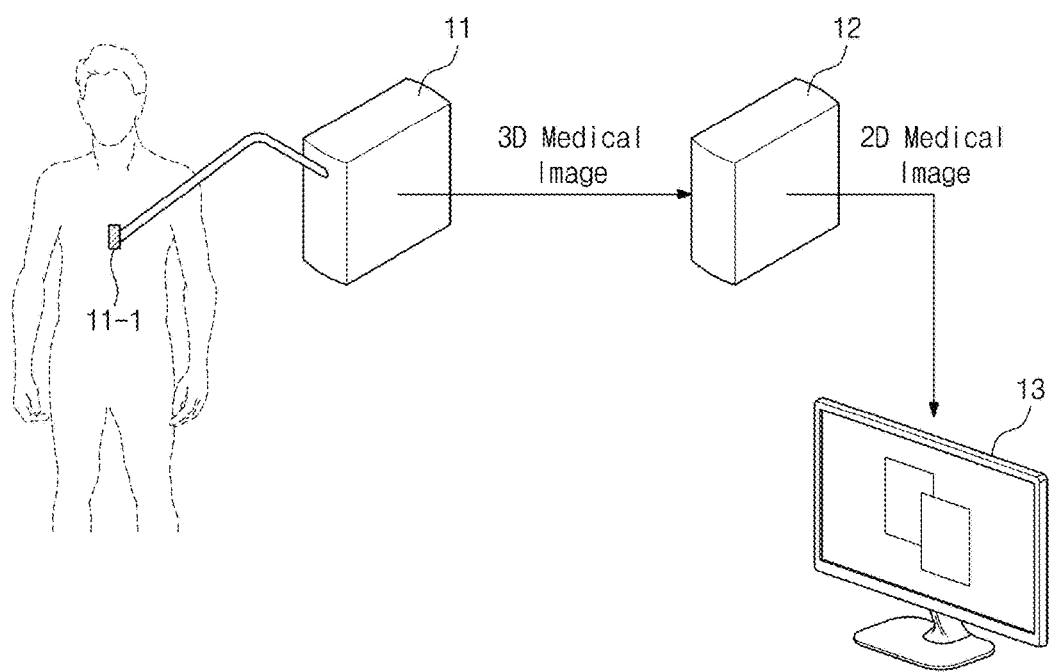
FIG. 1 is a view illustrating a general medial imaging device exemplarily.

In the following, the contents of the inventive concept will be described clearly and in detail with reference to the drawings so that those skilled in the art easily carry out the inventive concept.

Embodiments according to the inventive concept may have various modifications and various forms, so that they are illustrated in the drawings and described in detail herein. However, this does not limit various embodiments of the inventive concept to a specific embodiment and it should be understood that the inventive concept covers all the modifications, equivalents, and/or replacements of the inventive concept provided they come within the scope of the appended claims and their equivalents.

It will be understood that the terms "first" and "second" are used herein to describe various components but these components should not be limited by these terms. The terms are used only for the purpose of distinguishing one component from another and for example, without departing from the scope of the invention concept, a first component may be referred to as a second component and similarly a second component may also be referred to as a first component.

When it is mentioned that a certain component is "coupled with" or "connected with" another component, it should be understood that the certain component is directly "coupled with" or "connected with" to the other component or a further component may be located therebetween. In contrast, when it is mentioned that a certain component is "directly coupled with" or "directly connected with" another component, it will be understood that a further component is not located therebetween. Other expressions that describe the relationship between components, such as "between" and "directly between" or "adjacent to" and "directly adjacent to", should be interpreted in the same manner.

In various embodiments of the inventive concept, terms used in this specification are used to describe specific embodiments, and are not intended to limit the scope of the inventive concept. The singular expressions include plural expressions unless the context clearly dictates otherwise. Additionally, in various embodiments of the inventive concept, the term "include," "comprise," "including," or "comprising," specifies a property, a region, a fixed number, a step, a process, an element and/or a component but does not exclude other properties, regions, fixed numbers, steps, processes, elements and/or components.

Otherwise indicated herein, all the terms used herein, which include technical or scientific terms, may have the same meaning that is generally understood by a person skilled in the art. In general, the terms defined in the dictionary should be considered to have the same meaning as the contextual meaning of the related art, and, unless clearly defined herein, should not be understood abnormally or as having an excessively formal meaning.

FIG. 1 is a view illustrating a general medial imaging device exemplarily. Referring to FIG. 1, a medical imaging device 10 may include a 3D medical image detection device 11, a 2D medical image generation device 12, and a display device 13.

The 3D medical image detection device 11 may detect a plurality of sectional images of a specific part of the patient's body while changing the position and direction of a probe 11-1, and may generate a 3D medical image based on such sectional images. The 2D medical image generation device 12 receives a 3D medical image and converts the 3D medical image into a 2D medical image based on the 3D medical image. The display device 13 may receive a 2D medical image from the 2D medical image generation device 12 and display it.

With the development of hardware and software of medical devices, various 3D medical images are taken. 3D medical images provide users with more information and have the advantage of clearly identifying lesions or regions of interest. However, 3D medical images have the disadvantage of increasing the reading time, and there are more clearly visible lesions in 2D medical images. In fact, a digital breast tomosynthesis (DBT), that is, a 3D mammography, has an excellent mass detection rate and a mammography (i.e., a breast cancer examination using X-ray), that is, a 2D medical image, has strength in micro-calcification expression. Clinical test results show a higher reading rate when both 2D and 3D images are used for reading. Since the radiation dose of a patient is increased when both a 3D medical image and a 2D image are photographed, a method for generating a 2D medical image from a 3D medical image is used. However, when a 2D medical image is generated, an issue due to the superposition of soft tissues is generated, so that it is difficult to express a lesion or a region of interest clearly.

As a method for generating a 2D medical image from a 3D medical image, a method for combining an average value projection method and a maximum value projection method is proposed. This is a method for creating a new composite slice by applying an average value projection method to an arbitrary number of peripheral slices for each slice, and then making a composite projection image for the whole through a maximum value projection method. Alternatively, a composite slice is created using the maximum value projection method and the average value projection method is applied to create a composite projection image for the entire DBT. This improves the disadvantages of the average and maximum value projection methods by creating a new composite slice, but weakens the advantages of noise and boundary information. Thus, areas unrelated to lesions or areas of interest may be highlighted.

On the other hand, in relation to a method for generating a plate interpolation based 2D medical image using a lesion and a interest region information according to the inventive concept, the weight of a slice may be generated to enhance the sharpness of the lesion or the region of interest and generate the emphasized image more than the surroundings.

In addition, a method using a single plate spline may increase the sharpness of a lesion or an area of interest through a method for generating a 2D medical image by increasing the weight of a slice having a lesion or a region of interest. However, since this method uses a single plate spline, it may cause distortion in a 2D medical image if lesions or regions of interest are overlapped. On the other hand, a method for generating a plate interpolation based 2D medical image according to an embodiment of the inventive concept may obtain a clear 2D medical image even in overlapping lesions or regions of interest by using one or more plate interpolation.

A medical imaging device and an operating method thereof according to an embodiment of the inventive concept may be used for effective reading of a 3D medical image. The 3D medical image may solve the superposition issue caused by a soft tissue generated from the 2D medical image, but has an issue that the reading amount increases. In some medical images, after a 2D medical image is read and a 3D medical image is used only in the suspicious area, and the reading time is reduced by using a 3D medical image only in a suspicious area after a 2D medical image is read, and since the reading performance is excellent when both 2D and 3D images are used, the two images are used. However, 2D medical images have an image of overlapping soft tissues. When both 2D and 3D medical images are photographed, the amount of exposure to a patient is increased. Therefore, it is necessary to generate a 2D medical image with minimal overlapping soft tissues from a 3D medical image.

Figure 2:
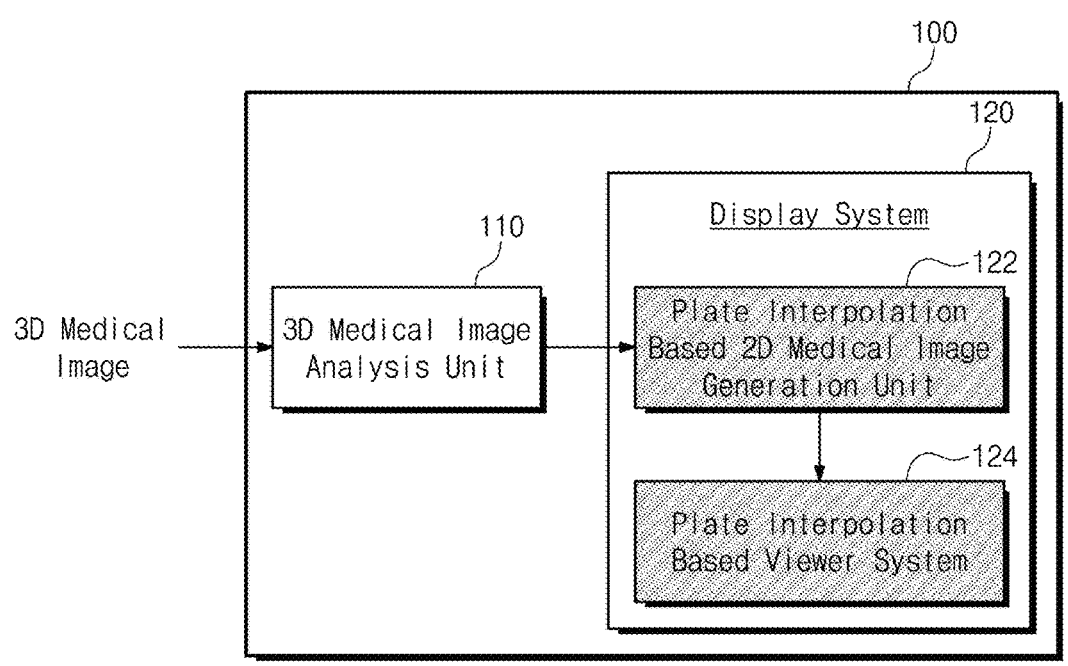
FIG. 2 is a view illustrating a medical imaging device according to an embodiment of the inventive concept.

FIG. 2 is a view illustrating a medical imaging device 100 according to an embodiment of the inventive concept. Referring to FIG. 2, the medical imaging device 100 may include a 3D medical image analysis unit 110, and a display system 120.

When a 3D medical image is inputted from the 3D medical image detection device (see FIG. 1), the 3D medical image analysis unit 110 may perform a 3D medical image analysis process, and based on this, extract a lesion or an area of interest. Here, the 3D medical image analysis unit 110 may be implemented in a hardware/software/firmware manner. In an embodiment, the 3D medical image analysis process may use a method such as contrast analysis of 3D medical images or computer assisted diagnosis (CAD).

The display system 120 may be implemented to receive a 3D medical image that extracts a lesion or a region of interest, and then generate and display a plate interpolation based 2D medical image. As shown in FIG. 2, the display system 120 may include a plate interpolation based 2D medical image generation unit 122 and a plate interpolation based viewer system 124.

The plate interpolation based 2D medical image generation unit 122 may be implemented to generate a plate interpolation based 2D medical image by using the extracted lesion or region of interest.

The plate interpolation based viewer system 124 may be implemented to provide the generated 2D medical image to a reader as an image.

In addition, although it is shown that the display system 120 includes the plate interpolation based 2D medical image generation unit 122 and the plate interpolation based viewer system 124, the inventive concept is not necessarily limited thereto. It should be understood that a plate interpolation based 2D medical image generation unit may be implemented as a separate device outside the display system 120. Hereinafter, a method for generating a plate interpolation based 2D image medical image using a lesion or a region of interest and a method for effectively displaying a 2D medical image will be described in detail.

Figure 3:
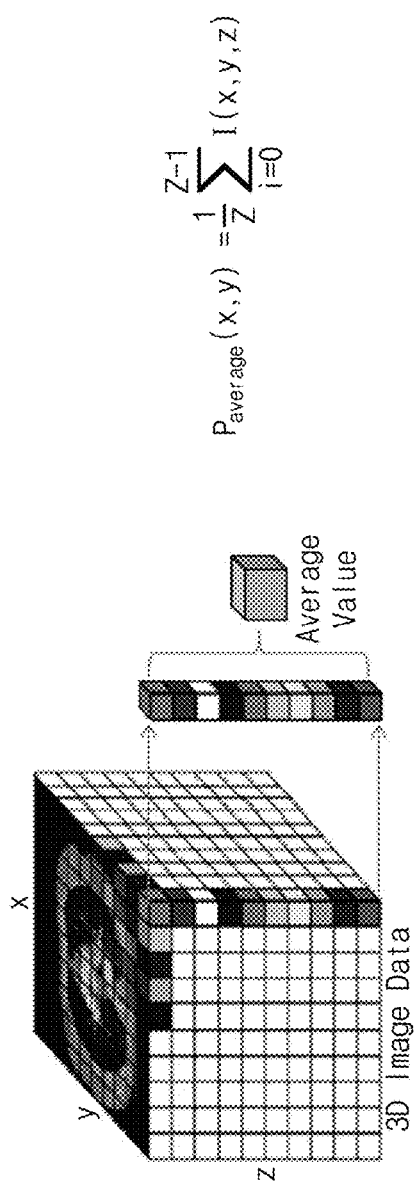
FIG. 3 is a view illustrating a method for generating a 2D projection image using an average value.

FIG. 3 is a view illustrating a method for generating a 2D projection image using an average value. Referring to FIG. 3, a 2D medical image may be generated by summing the intensities in the z-axis direction for each pixel and calculating an average value thereof.

$$P_{average}(x, y) = \frac{1}{Z}\sum_{i=0}^{Z-1} I(x, y, i)$$ [Equation 1]

A 2D medical image using the above-described average value may generate less noise. On the other hand, a 2D projection image generating method using a maximum value may be used to enhance boundary information.

Figure 4:
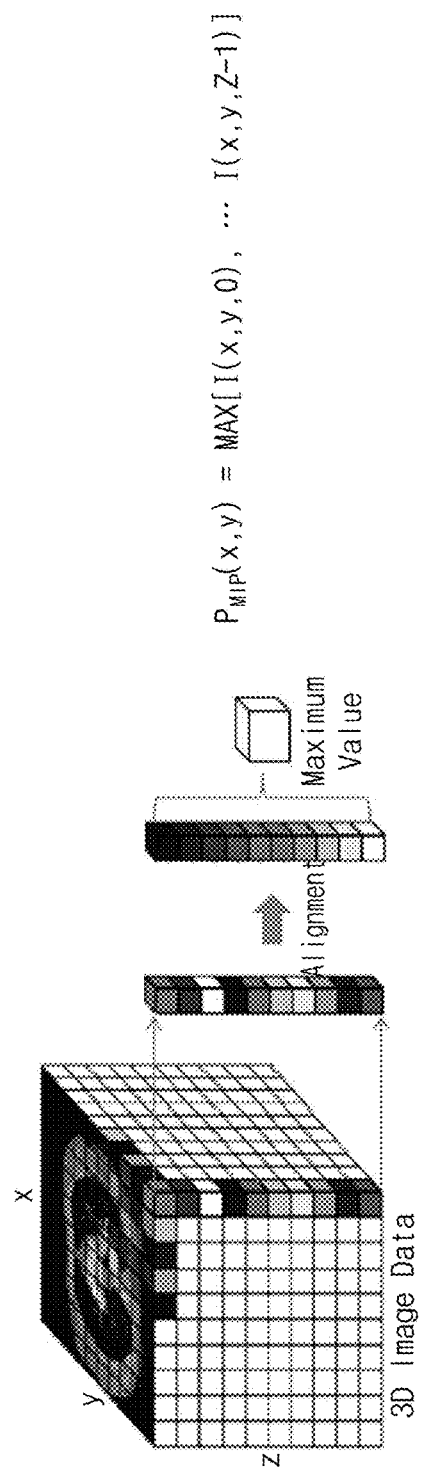
FIG. 4 is a view illustrating a method for generating a 2D projection image using a maximum value.

FIG. 4 is a view illustrating a method for generating a 2D projection image using a maximum value. Referring to FIG. 4, a 2D medical image may be generated by aligning all intensities in the z-axis direction with respect to each pixel according to the sizes and then determining the largest intensity as a representative value.

$$P_{MIP}(x,y)=\text{MAX}[I(x,y,0), \ldots ,I(x,y,Z-1)]$$ [Equation 2]

The 2D medical image generating method using the maximum value has an advantage of maintaining the boundary information, which is important information of an image.

On the other hand, a method of generating a 2D medical image based on a plate interpolation may improve the image quality by increasing the weighting of a slice where a lesion or a region of interest exists. Even if a region of interest overlaps with a soft tissue, it is combined with a high weight, so that the region of interest may be expressed clearly. The medical imaging device 100 according to an embodiment of the inventive concept may generate a clear 2D medical image even if a lesion or a region of interest is overlapped through a method of combining weights using one or more plates.

Figure 5:
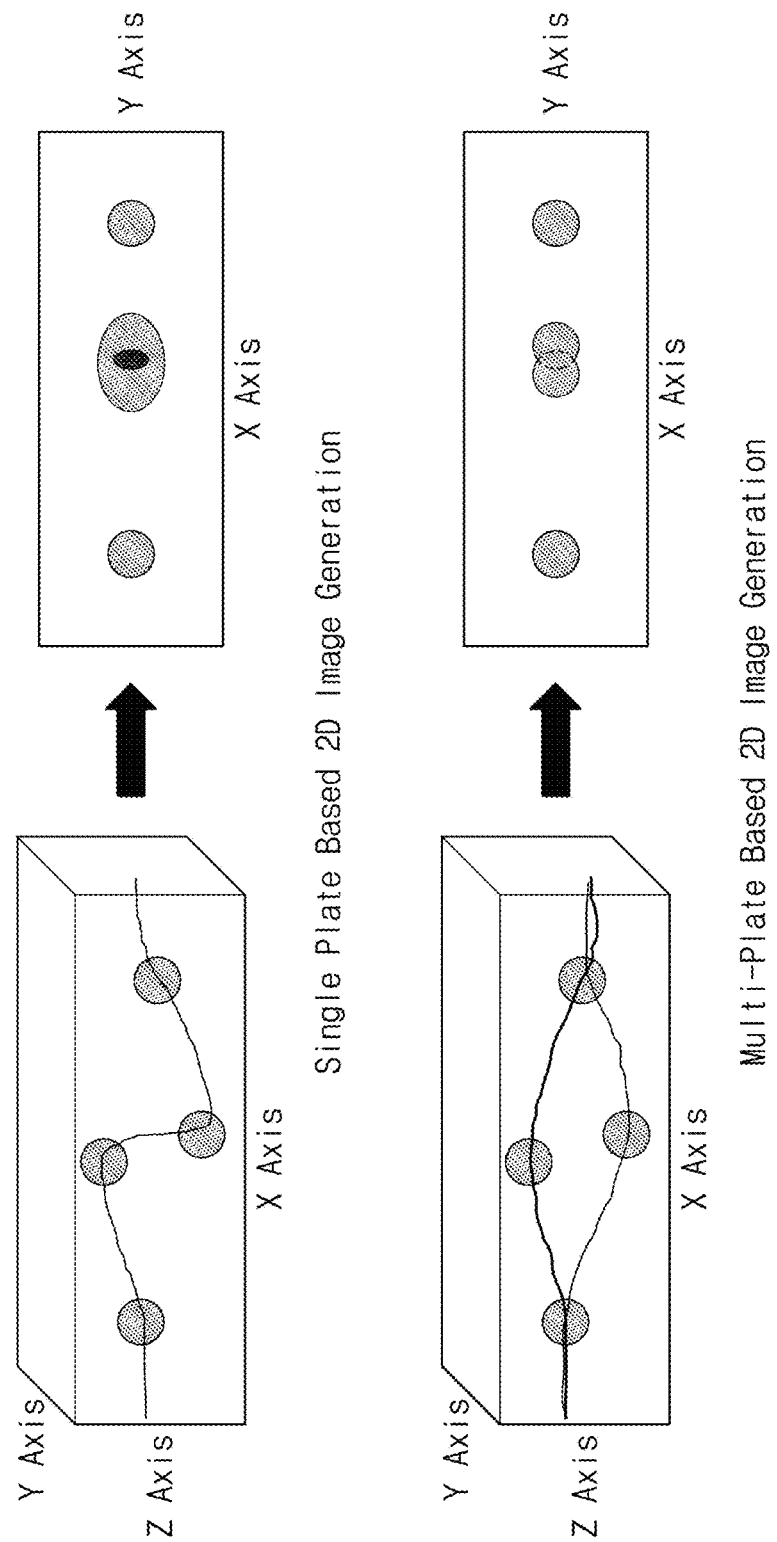
FIG. 5 is a view illustrating that a thin plate spline is used as an embodiment utilizing a plate according to an embodiment of the inventive concept.

FIG. 5 is a view illustrating a method of generating a plate based 2D medical image according to an embodiment of the inventive concept. Referring to FIG. 5, plate based 2D medical image generating methods are shown. In an embodiment, a single plate based 2D image generation may utilize a thin plate spline. At this time, a region of interest may overlap. In an embodiment, when lesions or regions of interest are overlapped, multi-plate based 2D image generation may minimize distortion by generating two or more splines. That is, the multi-plate based 2D image generation may improve the image quality even if regions of interest are overlapped.

Figure 6:
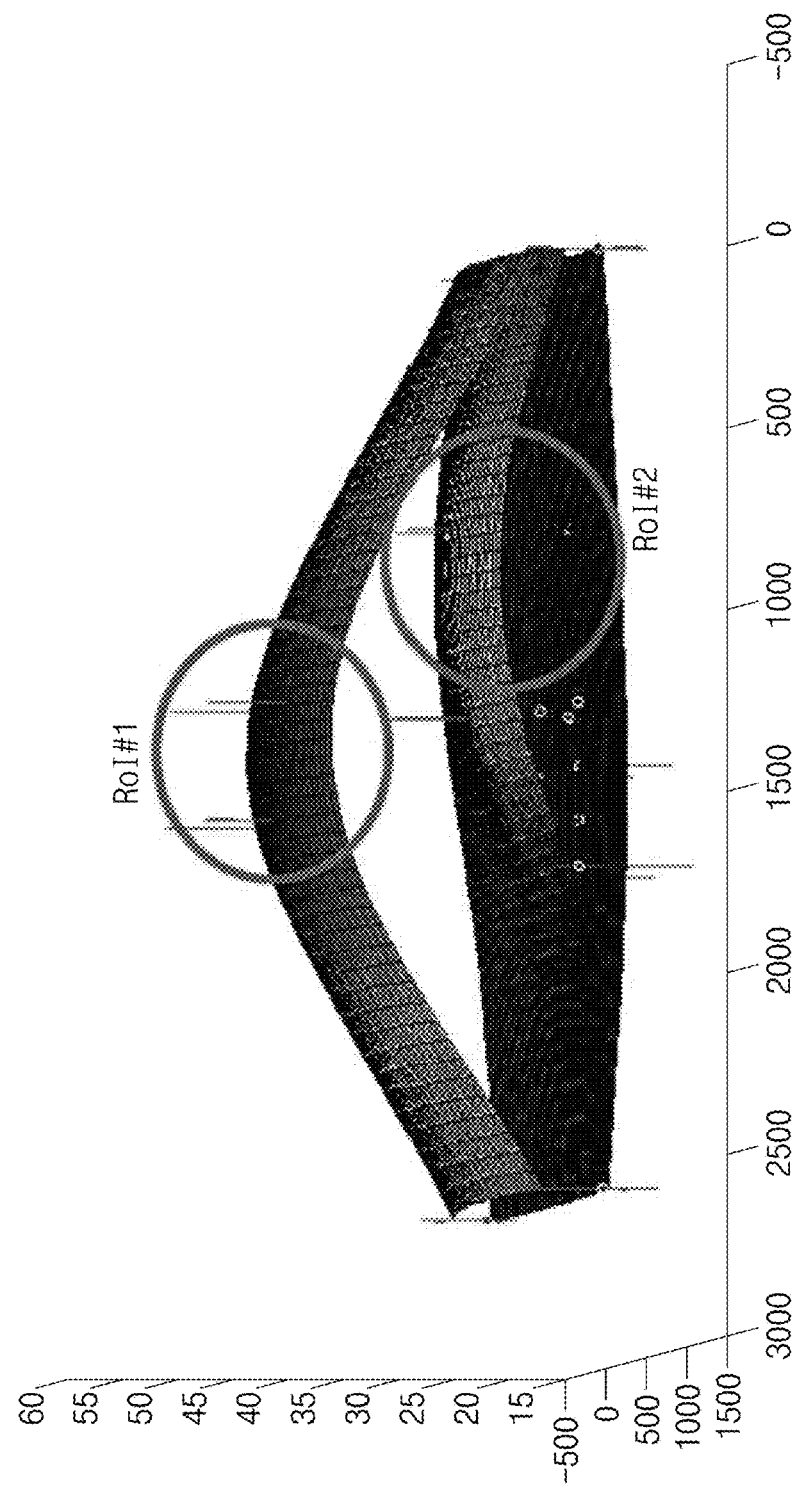
FIG. 6 is a view illustrating that a 2D medical image is generated from a 3D medical image according to an embodiment of the inventive concept.

FIG. 6 is a view illustrating plate interpolation based 2D medical image generation according to an embodiment of the inventive concept. Referring to FIG. 6, when the weight plate of a region of interest 1 RoI#1 passes the position of a region of interest 2 RoI#2 in the 2D medical image generation process, it is possible to reduce the weight of the region of interest 1 RoI#1 and maintain the weight of the region of interest 2 RoI#2. As a result, a 2D medical image for sharpening the region of interest 2 RoI#2 may be generated.

Figure 7A:
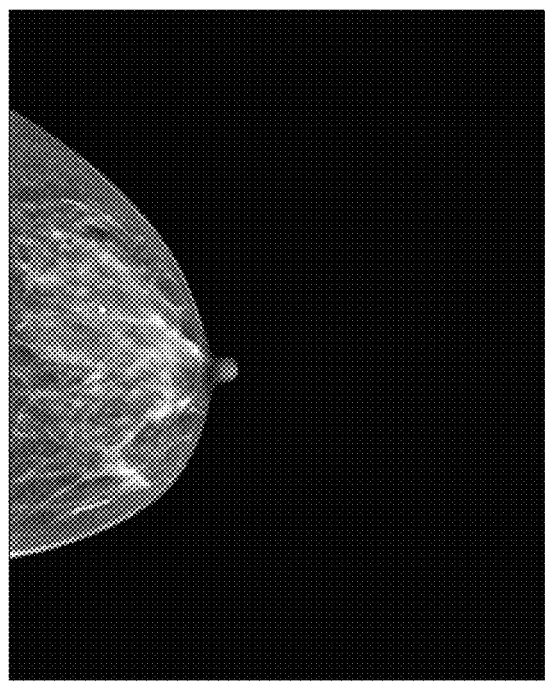
FIGS. 7A, 7B, and 7C are views illustrating a plate interpolation based viewer system according to an embodiment of the inventive concept.
Figure 7B:
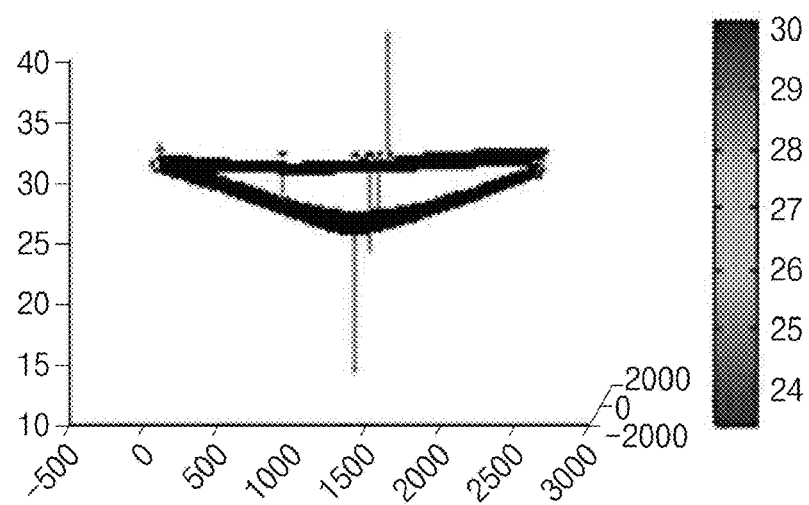
Figure 7C:
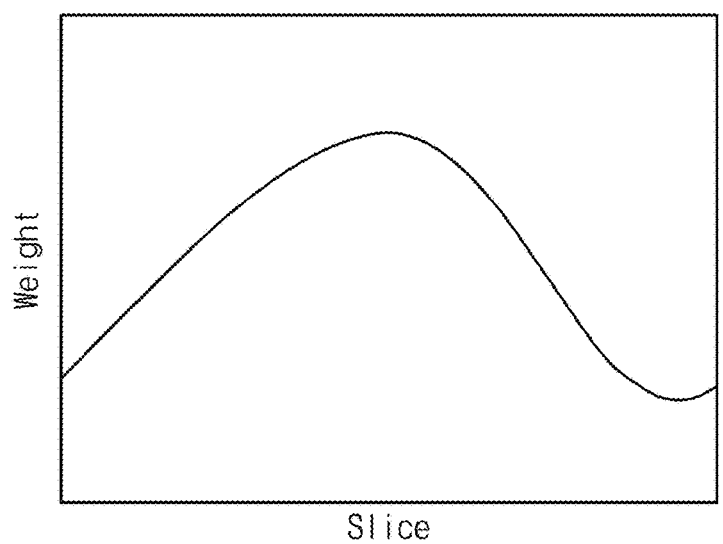

FIGS. 7A, 7B, and 7C are views illustrating screens of the plate interpolation based viewer system 124 according to an embodiment of the inventive concept. FIG. 7A is a screen of the plate interpolation based viewer system 124, which exemplarily shows a 2D medical image generated using a 3D medical image. FIG. 7B is a screen of the plate interpolation based viewer system 124, which exemplarily shows plate based weight information. FIG. 7C is a screen of the plate interpolation based viewer system 124, which exemplarily shows slice based weight (i.e., a region of interest) information.

On the other hand, as a user (e.g., a doctor) adjusts a weight for a region of interest or a slice weight using a weight information window, a medical imaging device according to an embodiment of the inventive concept may generate a new 2D medical image and may further include a user input system for performing a reading operation in real time. A first viewer system may generate a plate interpolation based 2D medical image on the basis of an automatically analyzed 3D medical image and display it on a screen, or display a new plate interpolation based 2D medical image on a screen according to a user's weight adjustment.

Figure 8:
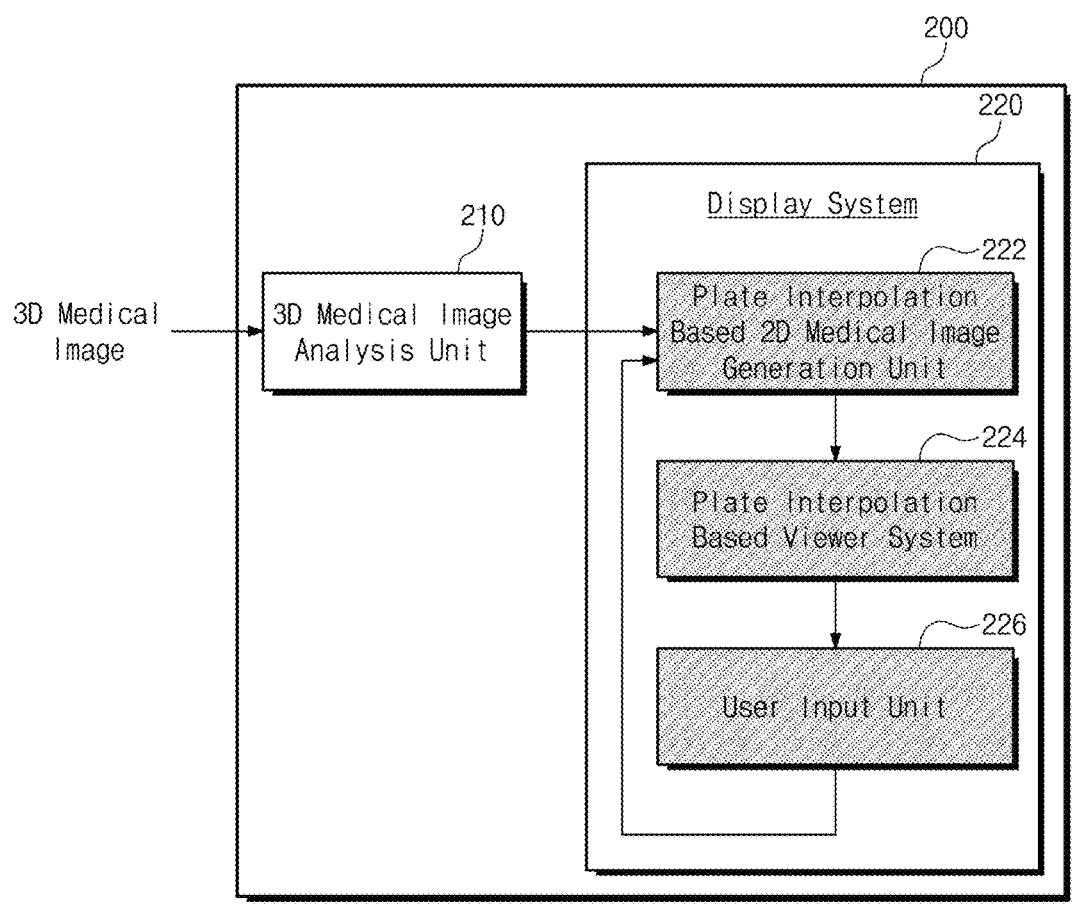
FIG. 8 is a flowchart illustrating a plate interpolation based viewer system by a user input according to an embodiment of the inventive concept.

FIG. 8 is a view illustrating a medical imaging device 200 according to another embodiment of the inventive concept. Referring to FIG. 8, the medical imaging device 200 may include a 3D medical image analysis unit 210, and a display system 220. The 3D medical image analysis unit 210 may be implemented in the same manner as the 3D medical image analysis unit 110 shown in FIG. 2. The display system 220 may be implemented to further include a user input 226 as compared to the display system 120 shown in FIG. 2. Through the result of the inventive concept, a 2D medical image that solves the issue of superimposition without additional dose may be generated. As a result, a reliable 2D medical image may be provided to a reader.

FIG. 9 is a view illustrating an operating method of a medical imaging device according to an embodiment of the inventive concept. Referring to FIGS. 1 to 9, a 2D medical image displaying method is as follows.

A medical imaging device may receive a 3D medical image (S110). Here, the 3D medical image may be received directly from a 3D medical image detection device, or may be received from a remote location via a wired/wireless network. The medical imaging device may receive a 3D medical image, and analyzes the received 3D medical image based on the plate based weight information and the interest region information (S120). The medical imaging device may generate a plate interpolation based 2D medical image from the analyzed 3D medical image (S130). Thereafter, the medical imaging device may display the plate interpolation based 2D medical image according to the input of a user (S140).

The inventive concept relates to plane interpolation based 2D medical image generation and a viewer capable of utilizing the resultant image thereof. A medical imaging device of the inventive concept may solve the superposition issue due to a soft tissue, which is an issue of the conventional 2D medical image, by generating a 2D medical image using a 3D medical image without additional dose. A 2D medical image with the superimposed issue solved may allow quick and accurate reading by a user. In addition, by displaying plate based weight information and interest region information on a viewer system, it is possible to generate an additional 2D medical image by a user. As a result, a medical imaging device of the inventive concept may improve the readability of a user.

A medical imaging device and an operation method thereof according to the inventive concept may generate a 2D medical image using a 3D medical image and resolve a superposition issue of a soft tissue on the basis of a plate interpolation, thereby allowing quick and accurate reading of a user.

In addition, a medical imaging device and an operation method thereof according to the inventive concept include a viewer system using plate based weight information and interest region information. Therefore, it is possible to generate an additional 2D medical image by a user, thereby improving the user's reading ability.

Although the exemplary embodiments of the present invention have been described, it is understood that the present invention should not be limited to these exemplary embodiments but various changes and modifications can be made by one ordinary skilled in the art within the spirit and scope of the present invention as hereinafter claimed.

What is claimed is:

1. An operating method of a medical imaging device, the method comprising:
   receiving a 3D medical image including a plurality of slices generated by a 3D medical image detection device;
   extracting a first region of interest and a second region of interest from the 3D medical image;
   generating a 2D medical image from the 3D medical image by adjusting a first weight corresponding to the first region of interest and a second weight corresponding to the second region of interest and composing the plurality of the slices based on the first and second weights; and
   displaying the 2D medical image interpolated by the first and second weights, and
   wherein the first region of interest overlaps with the second region of interest in a thickness direction of the plurality of the slices.

2. The method of claim 1, wherein the extracting the region of interest uses contrast analysis or computer assisted diagnosis.

3. The method of claim 1, wherein the generating of the 2D medical image comprises setting the first weight and second weights to be increased, and
   wherein the first weight is provided to a first slice corresponding to the first region of interest, and the second weight is provided to a second slice corresponding to the second region of interest.

4. The method of claim 1, wherein the generating of the 2D medical image comprises generating a multi-plate based 2D medical image.

5. The method of claim 1, wherein the displaying of the 2D medical image comprises adjusting a third weight corresponding region of interest, and
   wherein the third weight is a plate based weight.

6. The method of claim 1, wherein the displaying of the 2D medical image comprises adjusting a third weight corresponding to a third region of interest, and
   wherein the third weight is a slice based weight.

7. The method of claim 1, wherein the displaying of the 2D medical image comprises adjusting interest region information.

8. The method of claim 1, wherein the 2D medical image is generated by mammography.

9. The method of claim 1, wherein the generating of the 2D medical image comprises setting the first weight to be decreased and the second weight to be maintained.

10. A medical imaging device comprising:
    a computer assisted diagnosis system configured to receive a 3D medical image including a plurality of slices and extract a first region of interest and a second region of interest from the received 3D medical image;
    a 2D medical image generation processor configured to generate a 2D medical image from the 3D medical image by adjusting a first weight corresponding to the first region of interest and a second weight corresponding to the second region of interest and composing the plurality of the slices based on the first and second weights; and
    a plate interpolation based viewer system configured to display the 2D medical image interpolated by the first and second weights, and
    wherein the first region of interest overlaps with the second region of interest in a thickness direction of the plurality of the slices.

11. The device of claim 10, wherein the 2D medical image generation processor generates a multi-plate based 2D medical image.

12. The device of claim 10, wherein the plate interpolation based viewer system reduces the first weight and maintains the second weight when a weight plate passes a position of the first region of interest.

13. The device of claim 10, wherein the medical image device comprises a display system including the 2D medical image generation processor and the plate interpolation based viewer system.

14. The device of claim 13, wherein the display system further comprises a user input interface for inputting interest region information or weight adjustment information.

15. An operating method of a medical imaging device, the method comprising:

receiving a 3D medical image including a plurality of slices generated by a 3D medical image detection device;

extracting a first region of interest and a second region of interest from the 3D medical image;

generating a 2D medical image from the 3D medical image by adjusting a first weight corresponding to the first region of interest and composing the plurality of the slices based on the first weight; and displaying the 2D medical image interpolated by the first weight, and wherein the first region of interest overlaps with the second region of interest in a thickness direction of the plurality of the slices.

16. The method of claim 15, further comprising:

generating the 2D medical image from the 3D medical image by adjusting a second weight corresponding to the second region of interest and composing the plurality of the slices based on the first or second weight, wherein the displayed 2D medical image is interpolated by the first and second weights.

* * * * *